June 12, 1962
H. V. HANSEN
3,038,425
PLANTERS-ADJUSTABLE VALVE TIMING FOR HILL DROP
Filed Oct. 28, 1957
3 Sheets-Sheet 1
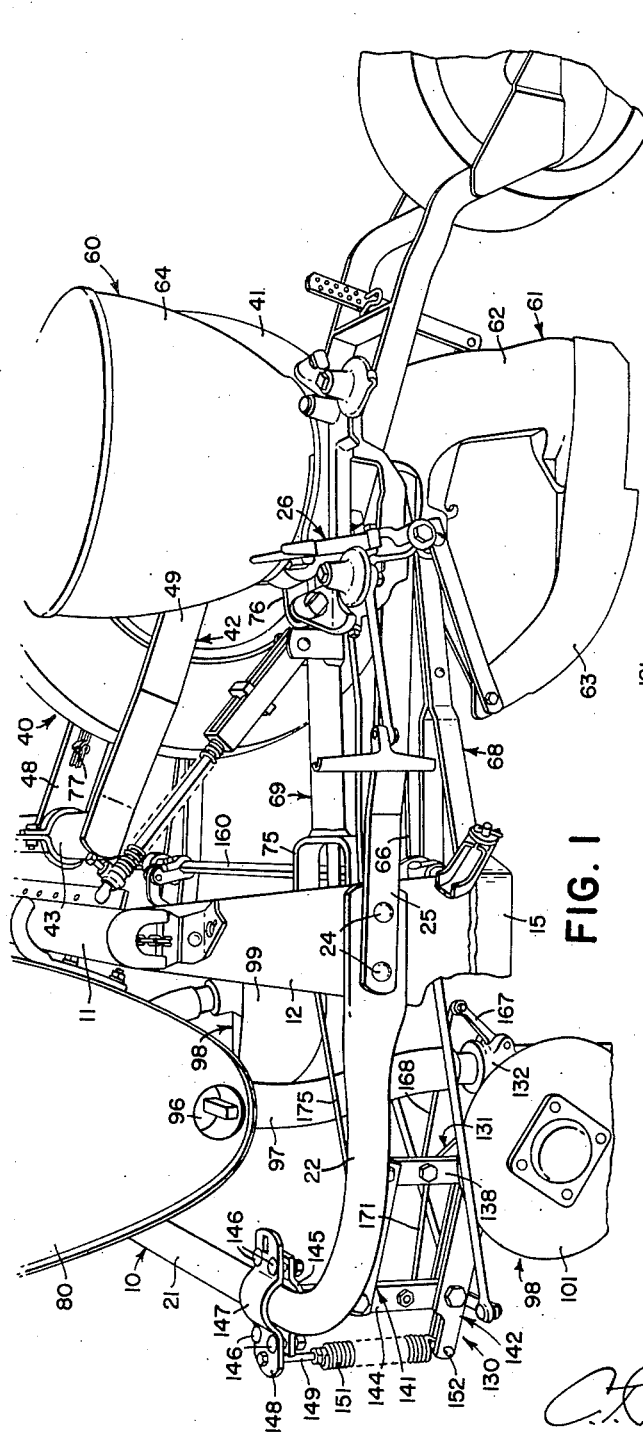
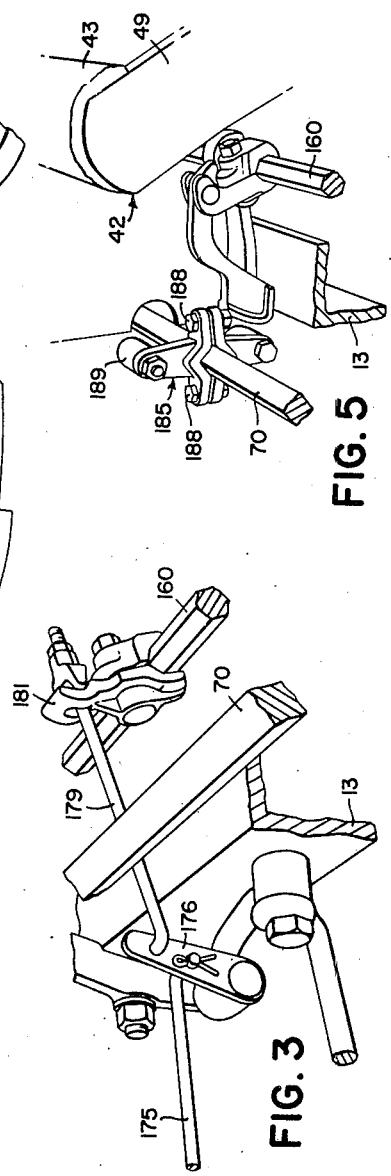
INVENTOR.
HAROLD V. HANSEN
BY
C. T. Parker and R. C. Johnson
ATTORNEYS

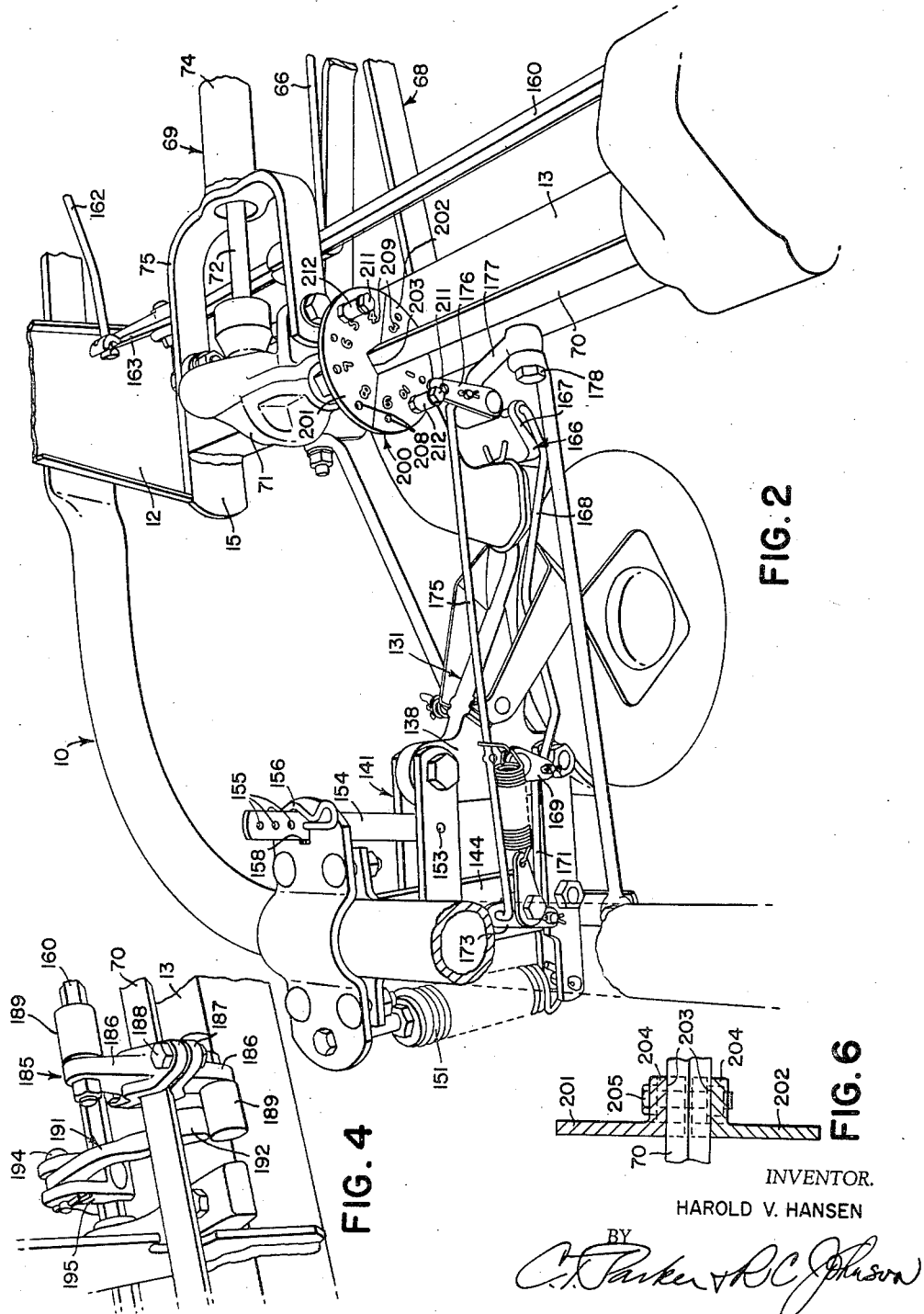

June 12, 1962 H. V. HANSEN 3,038,425
PLANTERS-ADJUSTABLE VALVE TIMING FOR HILL DROP
Filed Oct. 28, 1957 3 Sheets-Sheet 3

*INVENTOR.*
HAROLD V. HANSEN

ATTORNEYS

United States Patent Office 3,038,425
Patented June 12, 1962

3,038,425
PLANTERS-ADJUSTABLE VALVE TIMING FOR HILL DROP
Harold V. Hansen, Hillsdale, Ill., assignor, by mesne assignments, to Deere & Company, a corporation of Delaware
Filed Oct. 28, 1957, Ser. No. 692,695
7 Claims. (Cl. 111—34)

The present invention relates generally to agricultural implements and more particularly to seeding implements, especially those equipped with means for applying fertilizer along with the planting of the seed.

The object and general nature of the present invention is the provision of a new and improved planter for row crops, in which the fertilizer furrow openers are disposed a considerable distance ahead of the seed furrow openers, thereby permitting a greater latitude of lateral adjustment of the fertilizer distribution relative to the depositing of the seed and also permitting the application of larger amounts of fertilizer than would be practical when the fertilizer is distributed by means that is mounted closely adjacent the seed furrow openers, and in which new and improved means is provided for timing the opening of the fertilizer valves relative to the opening of the seed valves, as when hill dropping, so that the fertilizer and seed are placed in the ground in the proper positions, one relative to the other. As will be understood by those skilled in the art, the purpose of the above-mentioned lateral adjustment is to prevent the fertilizer from coming into direct contact with the seed.

More specifically, it is a feature of this invention to provide a planter having a fertilizer depositing means mounted a generally fixed distance ahead of the seed depositing means, and associated common means for operating the seed and fertilizer valves but in such timed relation relative to the rate of travel of the implement that the seed will be placed in the ground in the proper relation to the fertilizer deposited by the forwardly mounted fertilizer dispensing means.

It will be understood that by hill dropping is meant the operation of a planter that is so arranged that the drill shaft is operated continuously so long as the furrow openers are in operating position, the drill shaft driving the seed selecting plates continuously. Further, means on the drill shaft is connected so as to periodically open the seed valves, the period being selectively adjustable by varying the rate at which the drill shaft is rotated relative to the speed of travel of the implement. Thus, for example, the planter may be arranged so that the hill spacing is, for example, "$n$" inches, and if the fertilizer valve also opened simultaneously with the opening of the seed valves, and the furrow openers disposed a distance apart equal to "$n$" inches, or a multiple of "$n$" inches, the discharge of the fertilizer and seed will be properly correlated and the seed deposited in the ground in the proper relation relative to the fertilizer deposited therein. However, if the spacing of the fertilizer openers from the seed furrow opener is not equal to "$n$" inches or a multiple thereof, but is, for instance, equal to "$n$" plus "$x$" inches, then in order to have the seed and fertilizer deposited in the correct relation, the fertilizer valves will have to be opened a certain amount in advance of the opening of the seed valves. On the other hand, if, for example, the distance between the fertilizer and seed openers is equal to "$n$" minus "$x$" inches, then the opening of the fertilizer valves must be a certain amount later or behind the opening of the seed valves.

According to the present invention, I provide new and improved means whereby the proper timed relation between the opening of the fertilizer and seed valves may be easily and quickly secured.

These and other objects and advantages of the present invention will be apparent to those skilled in the art after a consideration of the following detailed description, taken in conjunction with the accompanying drawings, in which:

FIG. 1 is a fragmentary perspective view of a planting and fertilizer distributing implement in which the principles of the present invention have been embodied.

FIG. 2 is an enlarged fragmentary perspective view, showing the timing mechanism for operating the fertilizer valve in a selectively predetermined relation with respect to the operation of the associated seed valve.

FIG. 3 is a perspective view showing mechanism adapted to be substituted for a portion of the timing means shown in FIG. 2 when it is desired to check row plant, in which case the fertilizer and seed valves are operated simultaneously.

FIG. 4 is a fragmentary view showing striker means for operating the valve-actuating rockshaft, once for each revolution of the drill shaft. FIG. 5 is similar, showing means for operating the rockshaft twice for each revolution of the drill shaft.

FIG. 6 is an edge view of the valve timing wheel partly in section.

Figure 7:
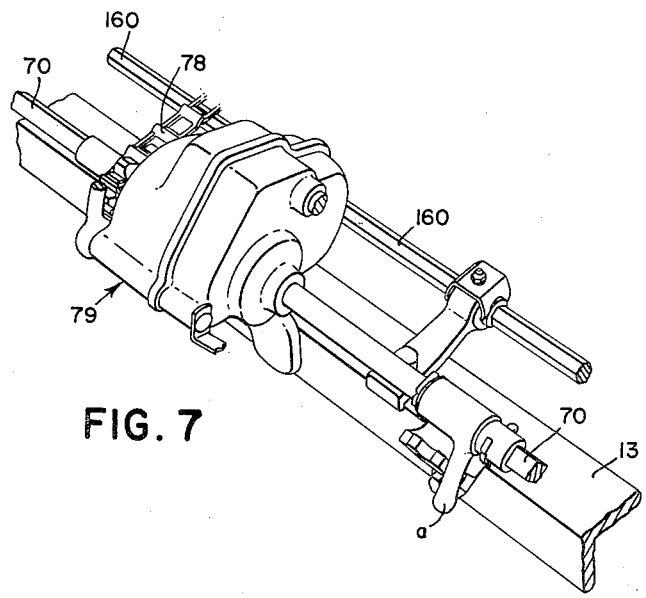
FIG. 7 is a fragmentary perspective view of the drive and ratio-changing means.

The planter of the present invention, as best shown in FIG. 1, comprises a main frame 10 that is made up of an upper sill bar, preferably in the form of a pipe 11, and a pair of vertical end sections, one of which is shown at 12 and each of which is generally triangular in configuration and secured in any suitable way, as by welding, at its upper end to the associated end of the upper sill pipe 11. The frame 10 also includes a lower transverse frame member 13 (FIG. 2), preferably in the form of an angle that extends from one end to the other of the frame 10, each end being secured, as by welding, to the lower end of the associated end section 12 through a transverse part 15. The part 15 is also securely fixed, as by welding, to the lower or base portion of the associated end section 12. The main frame 10 also includes a front pipe member 21 having its ends bent rearwardly, as at 22, and flattened so as to fit against the outer face of the associated end section 12. The flattened section is apertured to receive a pair of attaching bolts 24 that also extend through apertures in the associated end section 12. The bolts 24 also pass through the forward portion of an associated check head support bar 25 which at its rear end carries a check head 26 that is conventional, so far as the principles of the present invention are concerned, being constructed substantially like the check head shown in U.S. Patent 2,315,752 which issued April 6, 1943 to Charles H. White.

The implement shown in FIG. 1 is in the nature of a towed planter, being adapted to be connected by suitable hitch means with a farm tractor or other suitable propelling means. The main frame 10 is raised and lowered into and out of transport and operating positions by virtue of ground engaging means 40 that includes a pair of ground wheels 41 carried on a pair of wheel arms 42 that are fixed at their upper ends to a rockable shaft member 43, preferably in the form of a pipe, journaled in bearing brackets secured in any suitable way to the frame 10. Each wheel arm 42 includes an inner member 48 and an outer member 49 receiving the associated wheel 41 therebetween, the members 48 and 49 being secured, as by welding, to the rockable pipe member 43. The pipe member or rockshaft 43 is connected to be actuated by power derived from the tractor, preferably by suitable operating mechanism connected with a hydraulic cylinder. Since such means is conventional, so far as the principles of the present invention are concerned, these parts have not been shown in the drawings.

The implement shown in FIG. 1 is provided with both seeding means and fertilizing means. The seeding means is indicated in its entirety by the reference numeral 60 and comprises a plurality of planting units 61, each including a generally vertically disposed shank casting 62 carrying at its lower end a furrow opening runner 63 and at its upper end a seed hopper 64 and associated seed-selecting and dispensing mechanism (not shown), which may be of any suitable construction, preferably like that shown, for example, in the U.S. Patent 2,340,163, issued January 25, 1944 to Charles H. White. The planting unit 61 is substantially similar to the construction shown in the latter patent and includes suitable valve means operated by a link 66 (FIG. 1) that extends forwardly generally in parallelism with respect to lower link means 68 and upper link means 69 that connect each shank casting 62 with the associated frame 10. Preferably, the forward ends of the link members 68 and 69 are connected to an associated generally vertically disposed bracket 71 (FIG. 2) fastened in any suitable way to the lower sill angle 13 of the frame 10. There is, of course, one bracket 71 for each planting unit 61. The construction generally is similar to that shown in U.S. Patent 2,376,464, issued May 22, 1945 to Charles H. White, and hence further description appears to be unnecessary except to point out that the several brackets 71 support a transversely extending drill shaft 70 that is connected through suitable gearing to drive a plurality of seeding shafts 72 that extend rearwardly to the seed dispensing mechanisms in the associated planting units 61. The upper link 69 is in the nature of a pipe 74 through which the associated seeding shaft 72 extends, with front and rear yokes 75 and 76 pivotally connected to the associated bracket 71 and the forward portion of the runner shank 62, respectively. The shaft 70 is driven from the ground wheels 41 by interconnected drive chain means 77 (FIG. 1) and 78 (FIG. 7) and a speed change gearing unit 79, by which the rate of rotation of the drive shaft relative to the rate of travel of the planter may be selectively varied, as by shifting the shaft 70 axially, as is per se well known. For example, the shaft 70 may be shifted to different positions within the unit 79 by three-position arm *a* (FIG. 7) for selecting different drive ratios, the construction being similar to that shown in U.S. Patent 2,147,726, issued February 21, 1939, to C. H. White, to which reference may be made if desired.

The fertilizer dispensing means incorporated in the present implement comprises a pair of transversely elongated fertilizer hoppers or containers 80, only one of which is shown in FIG. 1. Each container 80 includes suitable dispensing augers 96 which serves to deliver fertilizer through fertilizer tubes 97 to associated fertilizer furrow openers 98, which may take the form of a shoe or runner 99 or a disk furrow opener 101, as best shown in FIG. 1. From FIG. 1 it will be noted that there is a planting unit 61, each with its own furrow opening runner 63, behind each fertilizer furrow opener 98. For check row operation, which will be referred to in detail below, the fore-and-after spacing between the seed furrow opener 63 and the associated fertilizer furrow opener 98 is substantially equal to the distance between adjacent rows, usually in the neighborhood of 40 inches.

Each fertilizer furrow opening unit is indicated in its entirety by the reference numeral 130, being disposed directly ahead of the associated planting unit 61 by a distance equal to the row spacing, in the preferred construction. Each fertilizer furrow opening unit 130 comprises a fertilizer boot casting 131 carrying the rotatable disk 101, or a pair of them in case the unit 98 is a double disk furrow opener. The lower end of the associated fertilizer tube is connected in any suitable way to the seed passage portion 132 of the fertilizer boot casting 131. Fixed to each fertilizer boot casting 131 is a generally upwardly extending standard 138 and a pair of parallel link members 141 and 142 are pivotally connected at their rear ends with the standard 138, and at the forward ends the link members 141 and 142 are pivotally connected to a depending bracket member 144 that is rigidly fixed to the associated front frame pipe member 21. To this end, the upper end of each bracket 144 carries a transverse or fore-and-aft extending saddle strap 145 that is apertured to receive bolts 146 by which the front and rear portions of an associated clamping cap member 147 is firmly and rigidly secured in place. The cap member has front and rear extensions 148, the front extension being apertured to receive an adjusting bolt 149 by which the upper end of a spring 151 is connected with the cap member 147. The lower end of the spring 151 is connected by a cotter 152 with the forwardly extended portion of the lower link 142. The upper link 141 carries a transverse pin 153 (FIG. 2) by which the lower end of a vertical bar 154 is pivoted to the upper link 141. The upper end of the bar 154 is provided with a plurality of apertures 155 in any one of which a hairpin connector 156, lying above the rear extended portion 157 of the upper cap member 147, may be disposed. The rear extension of the cap member 147 is provided with a slot 158 to receive the upper part of the bar or link 154. The spring 151 is sufficiently strong to hold the associated furrow openers down in the ground, and the connector 156 and the bar 154 serve as means that determine the depth of operation of the associated fertilizer furrow opener 98.

As mentioned above, the valves and other parts of the planting units 61 are operated by the links 66, and the latter, in turn, are operated by a rockshaft 160. When check rowing, oscillations of the check fork 161 of the check head 26 are transmitted to the rockshaft 160 by a link 162 and an arm 163 connecting the forward end of the link 162 to the rockshaft 160. The boot casting 131 of each fertilizer unit includes a flow controlling fertilizer valve 166 (FIG. 2), the rear portion of which is formed with or carries an operating arm 167 receiving an actuating link 168. The forward end of the link 168 is pivoted to a swingable supporting arm 169 carried by the standard section 138 of the fertilizer boot casting 131. Extending forwardly from the arm 169 is a fore-and-aft extending operating link 171 that at its forward end is connected to a lever 173 (FIG. 2) pivotally mounted on the depending standard 114. The upper end of the lever 173 pivotally receives a link 175 that extends rearwardly and is pivotally connected with an arm 176 that is swingably mounted on the support 177 carried by the planter frame, being connected thereto by a bolt 178. As is shown in FIG. 3, a rear link 179 is connected at its forward end with the upper portion of the swingable arm 176 and at its rear end is operatively connected with an arm 181 fixed to the rockshaft 160. Thus, when check rowing, each time the shaft 160 is rocked, as by oscillation of the associated check fork 161, the rear seed valves and the forward fertilizer valve are opened simultaneously to deposit seed and fertilizer in the ground. Since the fertilizer furrow openers are spaced a distance ahead of the seed furrow opener corresponding to the hill spacing, or, in other words, corresponding to the spacing between adjacent buttons on the check wire, at each operation of the rockshaft 160, the seed will be deposited in the ground at a point at which fertilizer was deposited at the preceding valve actuation.

The present invention is principally concerned, however, with the provision of means utilizing seed and fertilizer dispensing mechanism of the character just described for hill dropping in which the distance between adjacent hills is generally much more selectively variable than the spacing between hills when check rowing. As shown in FIG. 1, the fore-and-aft spacing between each seeding unit and the forwardly disposed fertilizer dispensing unit is primarily designed so as to secure proper deposition of the seed and fertilizer when check rowing. On the other hand, when hill dropping, where the spacing between adjacent hills is not substantially equal to the relatively fixed spacing between the fertilizer and seed dispensing units, if the seed and fertilizer valves were opened simultaneously, the seed would not necessarily be placed in the ground at a point where fertilizer was deposited at the immediately preceding operation. The present invention provides means for timing the operation of the fertilizer valve relative to the associated seed valve so that, whatever the spacing between hills that has been selected for hill dropping, the fertilizer will be deposited at a point in the ground alongside the point at which seed will be deposited at the next or subsequent operation of the seed valve during the travel of the implement. This timing mechanism will now be described.

In order to arrange the planter for hill dropping in which the drift shaft 70 and seed plates are continually driven, the valves are operated periodically so as to deposit the accumulated seed in hills. The spacing between the hills in hill dropping may be made, as desired, by changing the driving ratio between the ground wheels and the drill shaft and the spacing between the hills may vary from 12 inches or thereabout up to more than 100 inches. Generally, the rockshaft 160 is operated, during hill dropping, by suitable striker means on the drill shaft 70 and an associated arm on the rockshaft, the striker being arranged to operate the rockshaft 160, and open the associated valves, each time the drill shaft 70 has been rotated an amount sufficient to move the associated seed plates the distance required to select the number of seed desired in each hill.

According to the principles of the present invention, I provide a striker 185 which includes a pair of substantially identical striker arms 186 (FIG. 4), each having apertured lugs 187 to receive bolts 188 that fix the two arms in position on the drill shaft 70. Each striker arm 186 carries a suitable roller 189, and when the striker arms are arranged as shown in FIG. 4, only one roller is effective at each revolution of the drill shaft 70.

A roller engaging link 191 includes a head portion 192 adapted to slide across the adjacent portions of the planter frame sill angle 13, and the other end of the link 191 is pivoted, as at 194, to an arm 195 that is fixed in any suitable way to the rockshaft 160. Thus, when the striker rollers 189 are arranged as shown in FIG. 4, the rockshaft 160 is rocked once for each revolution of the drill shaft 70.

If one of the arms 186 were arranged so that its roller 189 operated in the same plane as the roller 189 of the other arm 186, then the rockshaft 160 would be operated twice for each revolution of the drill shaft 70. See FIG. 5.

In order to operate the fertilizer valve in advance of, or subsequent to, the operation of the seed valve, I disconnect and remove the link 179 (FIG. 3) from the arm 181. I provide a timing wheel 200 that is in the nature of a disk formed of two complementary halves 201 and 202, each having a socket section 203 adapted to fit over the drill shaft 70 in a non-rotatable manner, and also each disk half 201 and 202 is provided with a hub portion 204 with which associated securing means 205 is associated, the latter serving to hold the disk sections 201 and 202 in a fixed relation on the drill shaft 70. The unit 200 is mounted on the drill shaft 70 adjacent the arm 176, and each disk section 201 and 202 is provided with a number of openings 208, five being the preferred number, and placed adjacent each opening is a legend in the form of a number 209, the openings being numbered from 1 through 10 in one form of my invention. A striker stud 211 is adapted to be disposed in a selected opening 208, and the stud 211 carries a roller 212, the unit 200 being mounted on the drill shaft 70 so that the roller 212 is in a position to engage and shift the arm 176.

In operation, the rotation of the drill shaft 70 causes the striker 185 to rock the rockshaft 160, as shown in either FIG. 4 or FIG. 5, and thus open the seed valves to deposit the accumulated seed. By placing the stud 211 in the proper opening, the roller 212 thereon may be in a position to engage the arm 176 so as to also open the fertilizer valve 166 at the same time, if simultaneous valve operation is desired. Generally, however, in hill dropping, the relatively fixed spacing between the fertilizer and seed furrow openers will not be such that the seed will be placed in the proper relation with respect to the deposit of fertilizer when the seed and fertilizer valves are opened simultaneously, and hence it will be necessary, to secure this desired relation, to operate the fertilizer valves ahead of or later than the seed valve.

Let it be assumed that the drill shaft 70 is operated at such a rate that the drill shaft makes one revolution every 40 inches of forward travel of the planter, which distance is substantially the same as the relatively fixed distance between the fertilizer and seed furrow openers. However, let it be assumed further that the desired spacing for hill dropping is 30 inches. In that case the fertilizer valve should be opened about one-quarter of a revolution of the drill shaft 70 ahead of the opening of the seed valve. Such timed relation may be secured, according to the present invention, by putting the stud 211 in the proper opening in the disk 200. If the spacing is less than 30 inches, then the striker stud 211 should be secured to the disk 200 in a position farther in the direction of rotation of the unit 200.

If the rollers 189 are placed so that both operate the rockshaft 160, as shown in FIG. 5, then the timing disk 200 will be provided with two striker studs 211, each having an associated roller 212. In this case two oppositely disposed striker studs 211, as shown in FIG. 2, will provide for a hill spacing of 20 inches under the conditions first assumed above, namely, where one rotation of the drill shaft corresponds to a distance of 40 inches in the direction of forward travel and where the seed and fertilizer furrow openers are spaced apart a distance of 40 inches. Obviously, various combinations may be provided as desired by changing the positions and number of striker studs and by varying the speed of rotation of the drill shaft relative to the rate of forward travel, yet in all cases the fertilizer will be placed at points on the ground that will coincide with the points at which seed is subsequently deposited, thereby disposing the seed in the proper or desired relation relative to the deposited fertilizer.

As best shown in FIG. 6, the two parts of the timing wheel 200 are held together by securing means 205, as mentioned above, such securing means preferably being in the form of a pair of bolts. By loosening the bolts 205, the timing wheel 200 will be loosened, which then permits the drill shaft 70 to be shifted axially in the gear unit 79, and after the proper ratio has been selected, the timing wheel 200 may be brought to the proper position relative to the associated parts and the bolts 205 then tightened.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In a planter adapted to pass along a row to be planted, a mobile support, seed depositing means, fertilizer depositing means, means connecting said seed and fertilizer depositing means to said support, each of said depositing means having discharge spouts and the latter being disposed in a given fore and aft spaced apart relation so as to deposit material on the ground at two fore and aft spaced apart points when the two depositing means are operated simultaneously, adjustable ground engaging drive means connected with one of said depositing means to operate the same at a rate that is variously proportioned to the rate of travel of the planter so that the material dispensed by said one depositing means is deposited on the ground at points spaced apart various given distances along the row, and a second drive means connected to be driven with said first drive means for operating the other depositing means substantially exactly the same number of times as said one depositing means is operated, said second drive means including adjustable means operable to vary the relationship between the times of operation of the seed and fertilizer operating means so as to insure the deposit of seed and fertilizer in the soil at the desired adjacency.

2. In a planter, mobile frame means, a pair of separably operable dispensing means carried by said frame means, and actuating means therefor comprising a drill shaft rockably mounted on said frame means, a first striker on said drill shaft, means actuated by said first striker to operate one of said dispensing means, a second striker on said drill shaft, means carried by said frame means and actuated by said second striker to operate the other of said dispensing means, and means carried by the drill shaft to adjust the position of one striker circumferentially about the drill shaft axis relative to the other striker to thereby change the timing of dispensing operation of one dispensing means relative to the other while providing for an equal rate of dispensing operation.

3. In a planter, separably operable fertilizer valve means and seed valve means, a valve-operating rockshaft connected to operate one of said valve means, a drill shaft, a first means fixed to rotate with said drill shaft and connected to operate said rockshaft, a second means connected with the other valve means to open and close the latter, a third means fixed to rotate with said drill shaft and disposed to operate said second means, and a fourth means on said drill shaft fixing said third means in different positions around said drill shaft for varying the time of operation of said second valve means relative to the time of operation of said first valve means.

4. In a planter having a frame carrying a furrow opener for fertilizer and a furrow opener for seed spaced apart a normally fixed distance in a fore-and-aft extending direction, the combination of means for depositing seed in the furrow opened by the seed furrow opener, means for depositing fertilizer in the furrow opened by the fertilizer furrow opener, each of said two means including a dispensing valve adapted to be opened and closed, a common driving means carried by said frame and connected to operate both of said valves, said driving means including a rotatable part operable at a selectively variable rate relative to the rate of travel of the planter, a third means fixed to said rotatable part to operate one of said valves, and a fourth means adjustably fixed to said rotatable part to operate the other of said valves, said adjustable part being optionally shiftable about the axis of said rotatable part to different positions relative to said third means.

5. In a planter, a mobile frame, seed and fertilizer furrow openers fixed in fore and aft spaced apart relation to said frame, a rotatable shaft journaled on said frame, means carried by said frame and connected to rotate said shaft, a first means carried by said frame and adapted to dispense seed into the seed furrow opener, a second means carried by said frame and adapted to dispense fertilizer in said fertilizer furrow opener, a first part on said shaft and associated means operated thereby to actuate said first means, a second part on said shaft and associated means operated thereby to actuate said second means, and said first and second parts being disposed in angularly spaced apart relation with respect to the axis of rotation of said shaft, whereby the dispensing means associated with one furrow opener is operated prior in time to the operation of the dispensing means associated with the other furrow opener.

6. In a planter, separably operable fertilizer and seed dispensing valve means carried by said frame, a valve-operating rockshaft connected with one of said valve means, a drill shaft rotatably mounted on said frame, means on the latter to operate said rockshaft and said one valve means, means connected to open and close the other valve means and including a part rockably mounted adjacent said drill shaft, and means including a disk-like part carried on said drill shaft and a member circumferentially adjustable on said disk-like part for actuating said rockable part.

7. In a planter, a mobile frame, separably operable fertilizer and seed dispensing valve means, a valve-operating rockshaft carried by said frame and operably connected with one of said valve means to operate the same, a drill shaft rockably carried by said frame, means fixed in a given position about the axis of the drill shaft to rock said rockshaft and operate said one valve means, mechanism connected to open and close the other valve means and including a part rockably mounted on said frame adjacent said drill shaft, a disk-like part fixed to said drill shaft adjacent said rockable part and having a series of circumferentially spaced openings, and striker means disposable in selected openings in said disk-like part for engaging and rocking said rockably mounted part for operating the other valve means.

References Cited in the file of this patent

UNITED STATES PATENTS

| | | |
|---|---|---|
| 418,823 | Spangler | Jan. 7, 1890 |
| 471,624 | Schuler | Mar. 29, 1892 |
| 520,477 | Bemis | May 29, 1894 |
| 1,053,463 | Woodall | Feb. 18, 1913 |
| 1,993,649 | Crutcher | Mar. 5, 1935 |
| 2,096,298 | Greenwell | Oct. 19, 1937 |
| 2,164,066 | Holle | June 27, 1939 |
| 2,506,430 | Melvin | May 2, 1950 |